United States Patent
Harris (10) Patent No.: US 8,868,066 B2
(45) Date of Patent: Oct. 21, 2014

(54) EFFICIENT CACHE SELECTION FOR CONTENT DELIVERY NETWORKS AND USER EQUIPMENTS

(71) Applicant: Nokia Siemens Networks Oy, Espoo (FI)

(72) Inventor: John Harris, Glenview, IL (US)

(73) Assignee: Nokia Siemens Networks Oy, Espoo (FI)

( * ) Notice: Subject to any disclaimer, the term of this patent is extended or adjusted under 35 U.S.C. 154(b) by 32 days.

(21) Appl. No.: 13/721,131

(22) Filed: Dec. 20, 2012

(65) Prior Publication Data
US 2014/0179301 A1    Jun. 26, 2014

(51) Int. Cl.
*H04W 28/02* (2009.01)
*H04L 29/08* (2006.01)
*H04W 4/18* (2009.01)

(52) U.S. Cl.
CPC ....... *H04W 28/0289* (2013.01); *H04L 67/2852* (2013.01); *H04W 4/18* (2013.01)
USPC ........... 455/423; 455/424; 455/425; 455/450; 455/452.2; 370/216; 370/214

(58) Field of Classification Search
CPC ..... H04W 24/04; H04W 24/08; H04W 28/20; H04W 28/22; H04W 28/24
USPC .............. 455/423–425, 450–452.2, 436–441, 455/422.1; 370/216, 241
See application file for complete search history.

(56) References Cited

U.S. PATENT DOCUMENTS

| | | | |
|---|---|---|---|
| 6,195,622 B1 * | 2/2001 | Altschuler et al. | 703/2 |
| 7,818,450 B2 | 10/2010 | Chen et al. | 709/238 |
| 8,065,275 B2 * | 11/2011 | Eriksen et al. | 707/661 |
| 2001/0052075 A1 | 12/2001 | Feinberg | 713/168 |
| 2004/0110522 A1 * | 6/2004 | Howard et al. | 455/512 |
| 2006/0117139 A1 | 6/2006 | Kobayashi et al. | |
| 2007/0104213 A1 * | 5/2007 | Akamatsu | 370/449 |
| 2007/0112973 A1 | 5/2007 | Harris et al. | 709/232 |
| 2007/0124494 A1 | 5/2007 | Harris | 709/233 |
| 2007/0280105 A1 | 12/2007 | Barkay et al. | 370/229 |

(Continued)

FOREIGN PATENT DOCUMENTS

| | | |
|---|---|---|
| JP | 2011176595 A | 9/2011 |
| WO | WO-2008/027841 A2 | 3/2008 |
| WO | WO 2009/121413 A1 | 10/2009 |
| WO | WO 2009/142685 A1 | 11/2009 |

OTHER PUBLICATIONS

"Diametrer Base Protocol", P. Calhoun, et al., Network Working Group, Sep. 2003, 147 pgs.

(Continued)

*Primary Examiner* — Khai M Nguyen
(74) *Attorney, Agent, or Firm* — Harrington & Smith (57) ABSTRACT

Determining that a first object associated with a first wireless link has a first caching priority; determining that a second object associated with a second wireless link has a second caching priority; and increasing the first caching priority relative to the second caching priority in response to one or more of: the first wireless link having a larger congestion than the second wireless link, the first wireless link having a weaker signal strength than the second wireless link, or the first object being associated with a higher status or priority than the second object.

18 Claims, 4 Drawing Sheets

(56) References Cited

U.S. PATENT DOCUMENTS

| | | | |
|---|---|---|---|
| 2008/0151817 A1* | 6/2008 | Fitchett et al. | 370/329 |
| 2009/0291696 A1* | 11/2009 | Cortes et al. | 455/466 |
| 2009/0323612 A1 | 12/2009 | Bultinck et al. | 370/329 |
| 2010/0268836 A1 | 10/2010 | Jabri et al. | 709/231 |
| 2011/0044229 A1 | 2/2011 | Etemad et al. | 370/312 |
| 2012/0072678 A1 | 3/2012 | Biswas et al. | 711/154 |

OTHER PUBLICATIONS

Diameter Network Access Server Applications, P. Calhoun et al., Network Working Group. Aug. 2005, 85 pgs.

"Stream Control Transmission Protocol", R. Stewart, Network Working Group, Sep. 2007, 152 pgs.

"3$^{rd}$ Generation Partnership Project' Technical Specification Group Core Network and Terminals' Location Services (LCS); Diameter-based SLh interface for Control Plane LCS (Release 10)", 3GPP TS 29.173 V10.0.0, Mar. 2011, 17 pgs.

"3$^{rd}$ Generartion Partnership Project; Technical Specification Group Core Network and Terminals' Rx Interface and Rx/Gx signalling flows (Release 6)", 3GPP TS 29.211 V6.4.0, Jun. 2007, 27 pgs.

"3$^{rd}$ Generation Partnership Project; Technical Specification Group Core Network and Terminals; Policy and Charging Control over Gx reference point (Release 10)", 3GPP TS 29.212 V10.0.0, Sep. 2010, 121 pgs.

"3$^{rd}$ Generation Partnership Project; Technical Specification Group Core Network and Terminals; Policy and Charging Control Over Rx refrence point (release 10)", 3GPP TS 29.214 V10.1.0, Dec. 2010, 48 pgs.

"3$^{rd}$ Generation Partnership Project; Technical Specification Group Core Network and Terminals; 3 GPP Evolved Packet System (EPS); Evolved General Packet Radio Service (GPRS) Tunnelling Protocol for Control plane (GTPv2-C); Stage 3 (Release 10)", 3GPP TS 29.274 V10.3.0, Jun. 2011, 186 pgs.

"3$^{rd}$ Generation Partnership Project; Technical Specification Group Core Network and Terminals; General Packet Radio System (GPRS) Tunnelling Protocol User Plane (GTPvl-U) (Release 10)", 3GPP TS 29.281 VI0.0.0, Dec. 2010, 24 pgs.

"3$^{rd}$ Generation Partnership Project; Technical Specification Group Core Network and Terminals; Location Services (LCS); Evolved Packet Core (EPC) LCS Protocol (ELP) between the Gateway Mobile Location Centre (GMLC) and the Mobile Management Entity (MME); SLg interface (Release 9)". 3GPP TS 29,172 V9.2.0, Sep. 2010, 26 pgs.

"3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 9). Section 4.7.4", 3GPP TS 23.401 V9.8.0, Mar. 2011, 3 pgs.

*Media-independent handover*; http://en.wikipedia.org/wiki/Media-independent_handover.

U.S. Appl. No. 13/549,951, filed Jul. 16, 2012.
U.S. Appl. No. 61/655,688, filed Jun. 5, 2012.
U.S. Appl. No. 13/275,523, filed Oct. 18, 2011.

* cited by examiner

EFFICIENT CACHE SELECTION FOR CONTENT DELIVERY NETWORKS AND USER EQUIPMENTS

TECHNICAL FIELD

This invention relates generally to wireless networks and, more specifically, to performing cache selection at a content delivery network or a user equipment.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

The following abbreviations that may be found in the specification and/or the drawing figures are defined as follows:

3GPP third generation partnership project
API application programming interface
CDN content delivery network
CEM customer equipment management
CQI channel quality indicator
CSP communications service provider
DL downlink
ECGI E-UTRAN cell global identifier
eNB evolved Node B/base station in an E-UTRAN system
EPC evolved packet core
EUTRAN evolved UT N (LTE)
FDD frequency division duplex
HetNET heterogeneous network
HSS home subscriber server
ID identification
IMSI international mobile subscriber identity
KB kilobyte
LTE long term evolution
LTE-A long term evolution advanced
MME mobility management entity
P2P point-to-point
PLMN public land mobile network
RA routing area
RAN radio access network
RF radio frequency
RNC radio network controller
RRC radio resource control
SNR signal-to-noise ratio
TDD time division duplex
UE user equipment
UL uplink
URI uniform resource identifier
UTRAN universal terrestrial radio access network Due to wireless bandwidth constraints within cellular systems, there is an increasing need for techniques which provide lower latency access to requested content. Users may experience unacceptable latency when a wireless or cellular system fails to meet best effort delay requirements or targets. Unacceptable latency may occur at locations where signal strength is poor, such as near cell edges and in the vicinity of terrain obstructions, and where cells are loaded. Many systems provide service to premium users who are considered to be of a higher value or a higher priority than non-premium users. However, latency may prevent these premium users from receiving an acceptable level of service. The foregoing factors prevent many users from having a consistent experience when accessing content over the network.

Content delivery network (CDN) systems are becoming more and more prevalent within wireless communication systems. A CDN is a large distributed network of servers which may be deployed at multiple data centers throughout the Internet. One goal of a CDN is to serve content to end users with high availability and high performance. This content may include, for example, web objects (text, graphics, URLs and scripts), downloadable objects (media files, software, documents), applications (e-commerce, portals), live streaming media, on-demand streaming media, social networks, and other types of data. CDNs offload traffic served directly from a content provider's point of origin infrastructure, typically resulting in greater efficiencies and cost savings for the content provider. CDNs may serve content with dedicated servers, or with point-to-point (P2P) technology based upon peer-operated computers, or both.

Latency can be improved by retrieving content from a cache memory of a local CDN server rather than having to retrieve the content from the Internet on a remotely situated server. At the same time, the rapidly expanding memory capacity provided by present-day user equipment (UE) enhances the potential for UE caching to play a major role in reducing latency and achieving broadband efficiencies. However, conventional CDN systems and UE caching approaches are not sufficiently effective at reducing latency in situations where cells are loaded, where signal strength is poor, where access is attempted at locations near cell edges, and where premium users are to be served.

To perform caching, the CDN or the UE must make a decision as to which content should be retained in a cache memory. For example, the CDN or local server may store information or data objects that were downloaded for a first user such that the information or data objects need not be downloaded again if the information is subsequently requested by a second user. When determining which content should be stored in a cache memory, conventional caching approaches focus on identifying specific content that is most popular across the network, content that is most frequently requested, or content that was most recently requested. One purpose of caching is to enable the CDN or the UE to minimize the volume of traffic which needs to be retrieved from the general Internet down to the communications service provider (CSP) or over the air to the UE. Another purpose of caching is to reduce latency for the largest number of objects retrieved.

As a practical matter, loading on a cellular network is highly non-uniform. To consider an illustrative example, only 20% of the cells in a real-world system may be more than 80% loaded. In general, a small fraction of the cells are loaded whereas a much larger fraction of the cells are underloaded. Caching processes may be improved and latency reduced by differentiating between the popularity of objects retrieved in loaded cells and the popularity of objects retrieved in underloaded cells.

The cost of utilizing radio frequency (RF) resources throughout a cellular network is also highly non-uniform. These RF costs may be expressed in terms of physical resource blocks per kilobyte (KB) of data. The RF costs are much smaller if the user is near the cell tower as opposed to the cell edge. Caching an object to the cell edge saves a disproportionately large amount of eNB resources compared to caching an object near the cell tower. From the standpoint of a user, it is significantly more important to reduce latency at the cell edge versus near the cell tower. Additionally, reducing latency for a object which is being transferred to a user near the tower, is significantly less expensive than producing the same amount of latency reduction for a similar transfer to a user which is instead near the cell edge.

Another factor to consider is the generally non-uniform popularity of objects as a function of geographic location. In other words, it is typical for some objects to be consistently popular in one geographic area whereas other, different objects are consistently popular in other geographic areas. For example, a peer group gathers at a specific location, and everyone in the peer group automatically tends to become interested in the same group of objects. These objects may be items which are located on the Facebook™, LinkedIn™, or MySpace™ pages of the various members of the peer group. Such objects may pertain to sporting events, concerts, parties, and other social occasions. Likewise, a user may live or work at a specific location in an overloaded cell or at a cell edge. In these situations, the user is very likely to request many of the same objects which they have requested in the past, and furthermore the user is very likely to repeat requests for these objects from that specific location. Moreover, as indicated previously, the users themselves are non-uniform with respect to the network in the sense that some users, from a customer equipment management (CEM) perspective, may be of higher priority or value than other users.

SUMMARY OF THE INVENTION

According to a first aspect of the invention, a method comprises: determining that a first object associated with a first wireless link has a first caching priority; determining that a second object associated with a second wireless link has a second caching priority; and increasing the first caching priority relative to the second caching priority in response to one or more of: the first wireless link having a larger congestion than the second wireless link, the first wireless link having a weaker signal strength than the second wireless link, or the first object being associated with a higher status or priority than the second object.

In another set of exemplary embodiments, an apparatus includes at least one processor and at least one memory including computer program code. The at least one memory and the computer program code may be configured to, with the at least one processor, cause the apparatus to perform at least determining that a first object associated with a first wireless link has a first caching priority; determining that a second object associated with a second wireless link has a second caching priority; and increasing the first caching priority relative to the second caching priority in response to one or more of: the first wireless link having a larger congestion than the second wireless link, the first wireless link having a weaker signal strength than the second wireless link, or the first object being associated with a higher status or priority than the second object.

In another set of exemplary embodiments, a computer program product is provided. The computer program product includes at least one computer-readable storage medium having computer-executable program code instructions stored therein. The computer-executable program code instructions may include program code instructions for determining that a first object associated with a first wireless link has a first caching priority: determining that a second object associated with a second wireless link has a second caching priority; and increasing the first caching priority relative to the second caching priority in response to one or more of: the first wireless link having a larger congestion than the second wireless link, the first wireless link having a weaker signal strength than the second wireless link, or the first object being associated with a higher status or priority than the second object.

DETAILED DESCRIPTION OF THE DRAWINGS

Figure 1A:
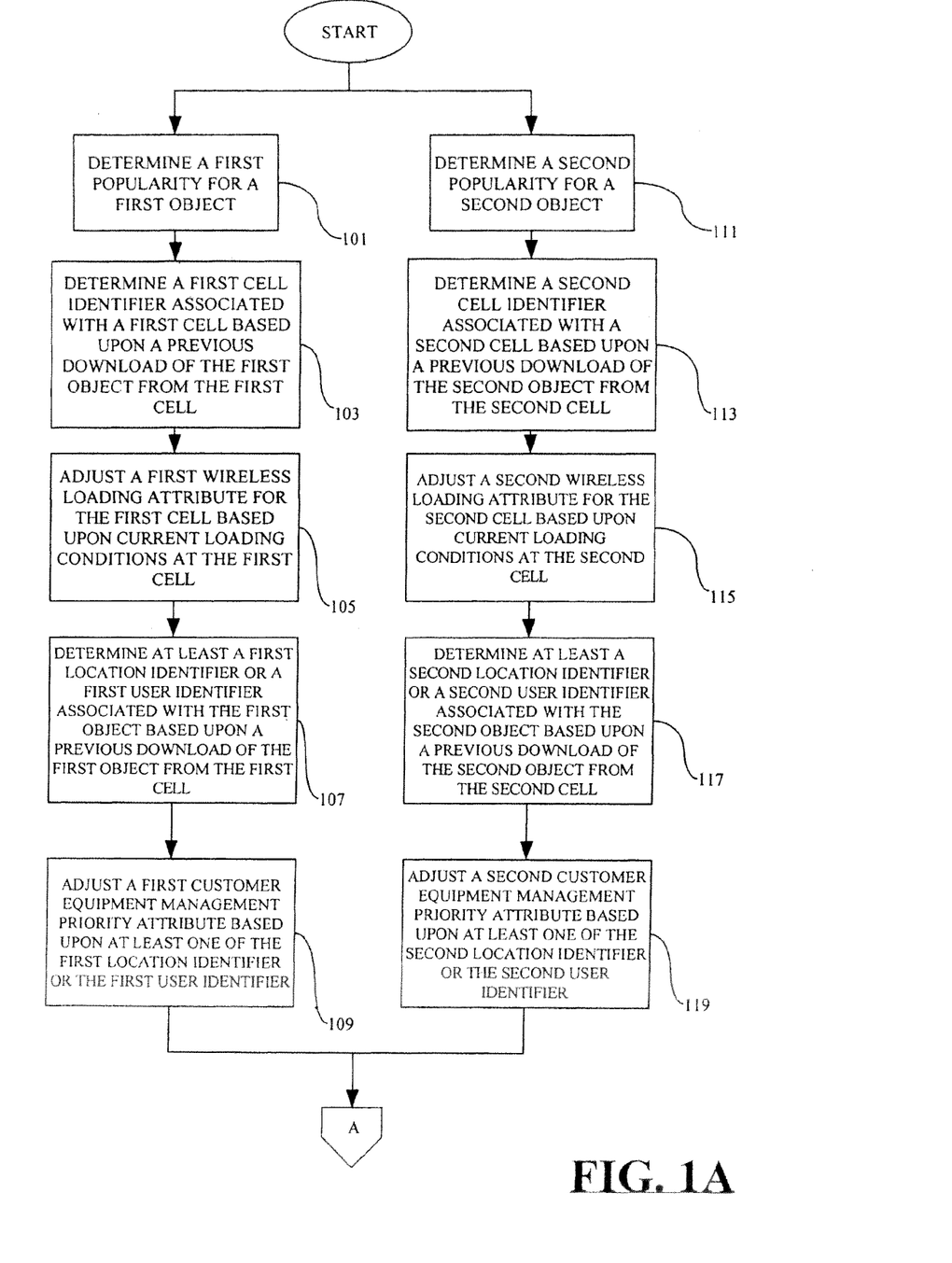
FIGS. 1A and 1B together comprise a flow diagram setting forth a first illustrative method of cache selection according to various exemplary embodiments of the invention.
Figure 1B:
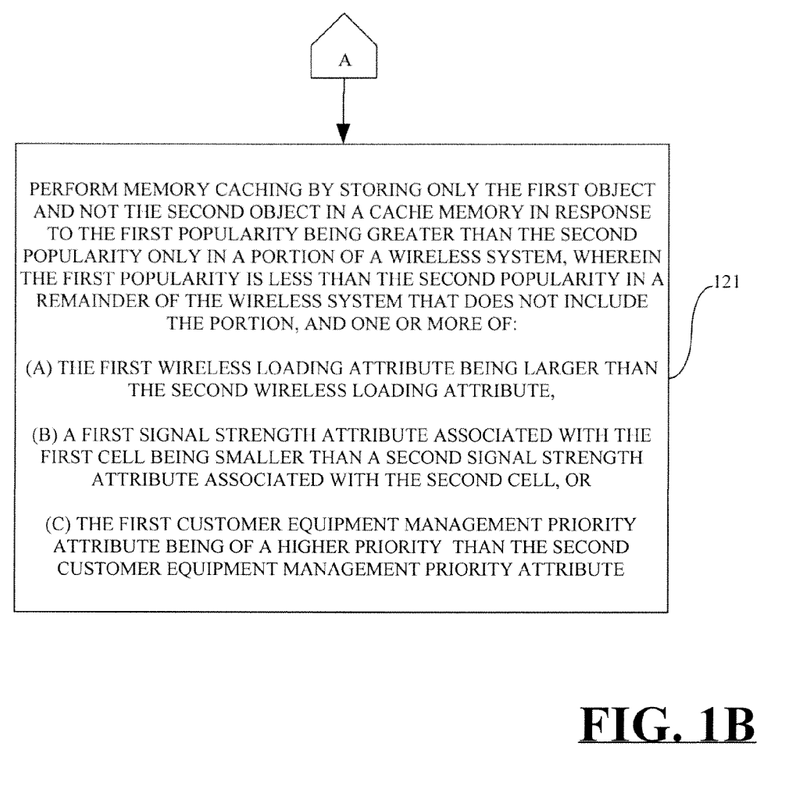

FIGS. 1A and 1B together comprise a flow diagram setting forth a first illustrative method of cache selection according to various exemplary embodiments of the invention. The operational sequence may commence at block 101, or at block 111, or at blocks 101 and 111 simultaneously. At block 101, a first popularity is determined for a first object. Next, a first cell identifier is determined that is associated with a first cell (block 103). The first cell identifier is determined based upon a previous download of the first object from the first cell. A first wireless loading attribute is adjusted for the first cell based upon current loading conditions at the first cell (block 105). At least a first location identifier associated with the first object or a first user identifier associated with the first object is determined (block 107). This determination is based upon a previous download of the first object from the first cell. At block 109, a first customer equipment management priority attribute is adjusted. This adjustment is based upon at least one of the first location identifier or the first user identifier that was determined at block 107.

At block 111, a second popularity is determined for a second object. Next, a second cell identifier is determined that is associated with a second cell (block 113). The second cell identifier is determined based upon a previous download of the second object from the second cell. A second wireless loading attribute is adjusted for the second cell based upon current loading conditions at the second cell (block 115). At least a second location identifier associated with the second object or a second user identifier associated with the second object is determined (block 117). This determination is based upon a previous download of the second object from the second cell. At block 119, a second customer equipment management priority attribute is adjusted. This adjustment is based upon at least one of the second location identifier or the second user identifier that was determined at block 117.

It should be noted that the operations of blocks 101-109 may be performed concurrently or in any order with respect to the operations of blocks 111-119. From block 109 or block 119 (FIG. 1A), the operational sequence progresses to block 121 (FIG. 1B) where memory caching is performed by storing only the first object and not the second object in a cache memory in response to the first popularity being greater than the second popularity only in a portion of a wireless system, wherein the first popularity is less than the second popularity in a remainder of the wireless system that does not include the portion, and one or more of: (a) the first wireless loading attribute being larger than the second wireless loading attribute; (b) a first signal strength attribute associated with the first cell being smaller than a second signal strength attribute associated with the second cell; or (c) the first customer equipment management priority attribute being of a higher priority than the second customer equipment management priority attribute.

The operational sequence of FIGS. 1A and 1B differs from conventional approaches where the more popular object is stored in cache memory. In contrast to such conventional approaches, a less popular object may be stored in cache memory in situations where the less popular object is less popular across an entire system but is actually more popular within some specific subset or portion of the system. For example, the specific subset or portion could, but need not, be defined as encompassing relatively heavily loaded areas where the cellular loading per cell is higher than in other less-loaded areas.

Figure 2:
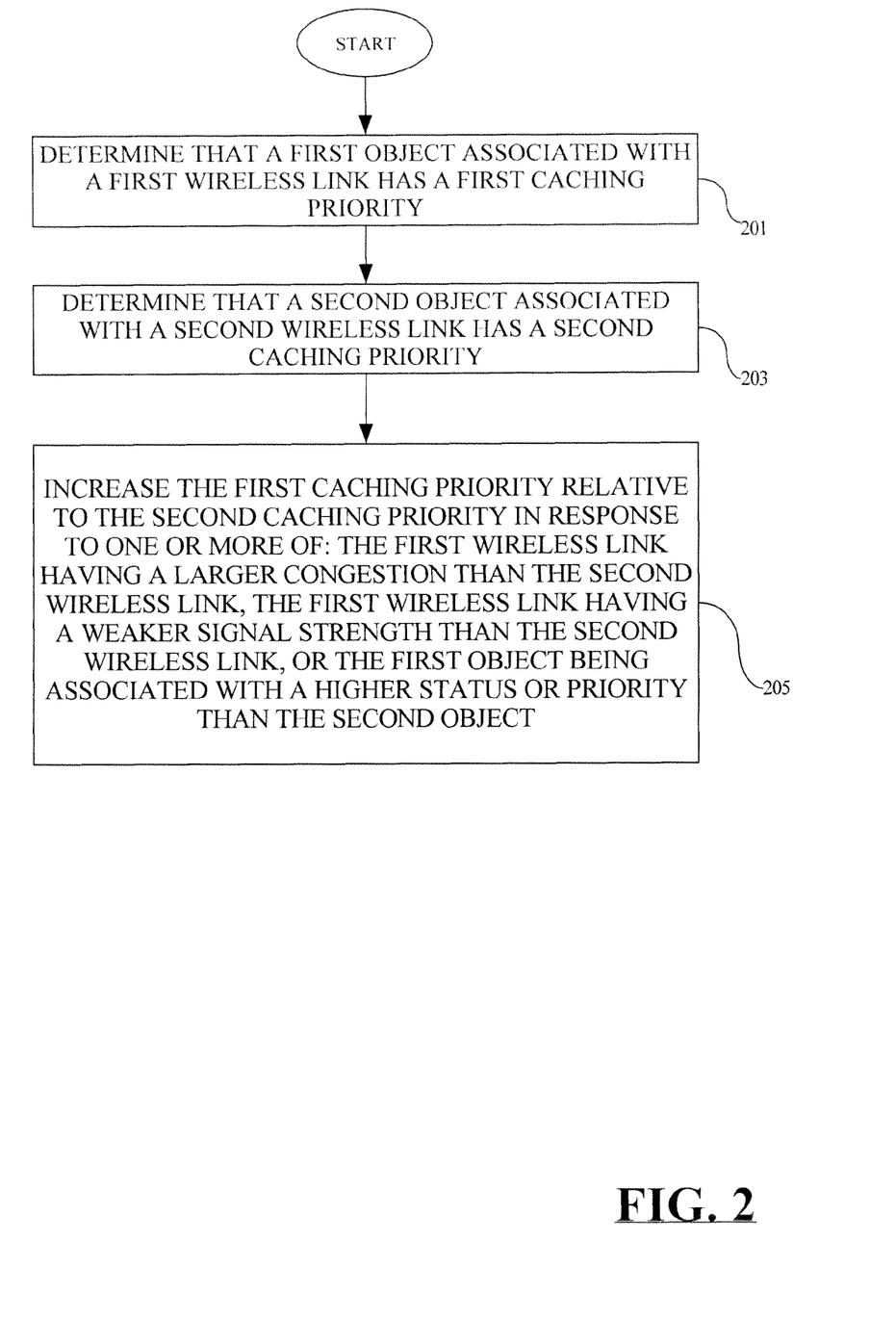
FIG. 2 is a flow diagram setting forth a second illustrative method of cache selection according to various exemplary embodiments of the invention.

FIG. 2 is a flow diagram setting forth a second illustrative method of cache selection according to various exemplary embodiments of the invention. The operational sequence commences at block 201 where a first object associated with a first wireless link is determined to have a first caching priority. At block 203, a second object associated with a second wireless link is determined to have a second caching priority. It should be noted that blocks 201 and 203 may be performed concurrently or in any order. Next, at block 205, the first caching priority is increased relative to the second caching priority in response to one or more of: the first wireless link having a larger congestion than the second wireless link, the first wireless link having a weaker signal strength than the second wireless link, or the first object being associated with a higher status or priority than the second object. Each of the respective first and second caching priorities may, but need not, specify a corresponding likelihood, probability, or ranking order in which an object associated with the respective caching priority will be stored in a cache memory.

Block 201 may optionally include identifying that the first object is retrieved in a first cell, or that the first object is likely to be retrieved in the first cell. Likewise, block 203 may optionally include identifying that the second object is retrieved in a second cell, or that the second object is likely to be retrieved in the second cell. The operations of block 205 may optionally consider anticipated congestion or loading of the first cell. Similarly, the operations of block 205 may optionally consider anticipated congestion or loading of the second cell. For example, if the first cell is not heavily loaded but is anticipated to become loaded or congested at a subsequent time or during a subsequent time interval, then the first object may be associated with a higher caching priority relative to the second object.

Pursuant to an illustrative scenario, in a first cell a first object is associated with a first popularity that is higher than a second popularity associated with a second object. However, the first popularity is less than the second popularity in a remainder of the wireless system that does not include the first cell. The first cell is not currently loaded or congested. Later, when the first cell is anticipated to increase in loading/congestion, the caching priority of the first object is then correspondingly increased based on this prediction of loading/congestion in the first cell. Thus, the content that is most likely to be retrieved in the most loaded or congested wireless cells is even a higher caching priority relative to other content. This process effectively deemphasizes traffic that is more popular in cells that are less loaded. Moreover, this process differs from conventional approaches where the more popular object is stored in cache memory. In contrast to such conventional approaches, a less popular object may be stored in cache memory in situations where the less popular object is less popular across an entire system but is actually more popular within some specific subset of the system. For example, the specific subset could, but need not, be defined as encompassing relatively heavily loaded areas where the cellular loading per cell is higher than in other less-loaded areas.

The operational sequences of FIGS. 1A, 1B, and 2 may further identify or determine that the first object is (typically) retrieved by a first user who was not previously designated as a premium CEM user, but is anticipated to be designated as a premium CEM user in the future or at a next time interval. In this scenario, the first object may be given a higher caching priority than the second object. Alternatively or additionally, anticipated loading may be calculated based on UE trajectories or patterns of mobility. For example, the wireless link associated with a particular object (or object type) is based on a historical retrieval of that object over that wireless link, or is based on other criteria enabling anticipation of retrieval of that object over the wireless link.

Figure 3:
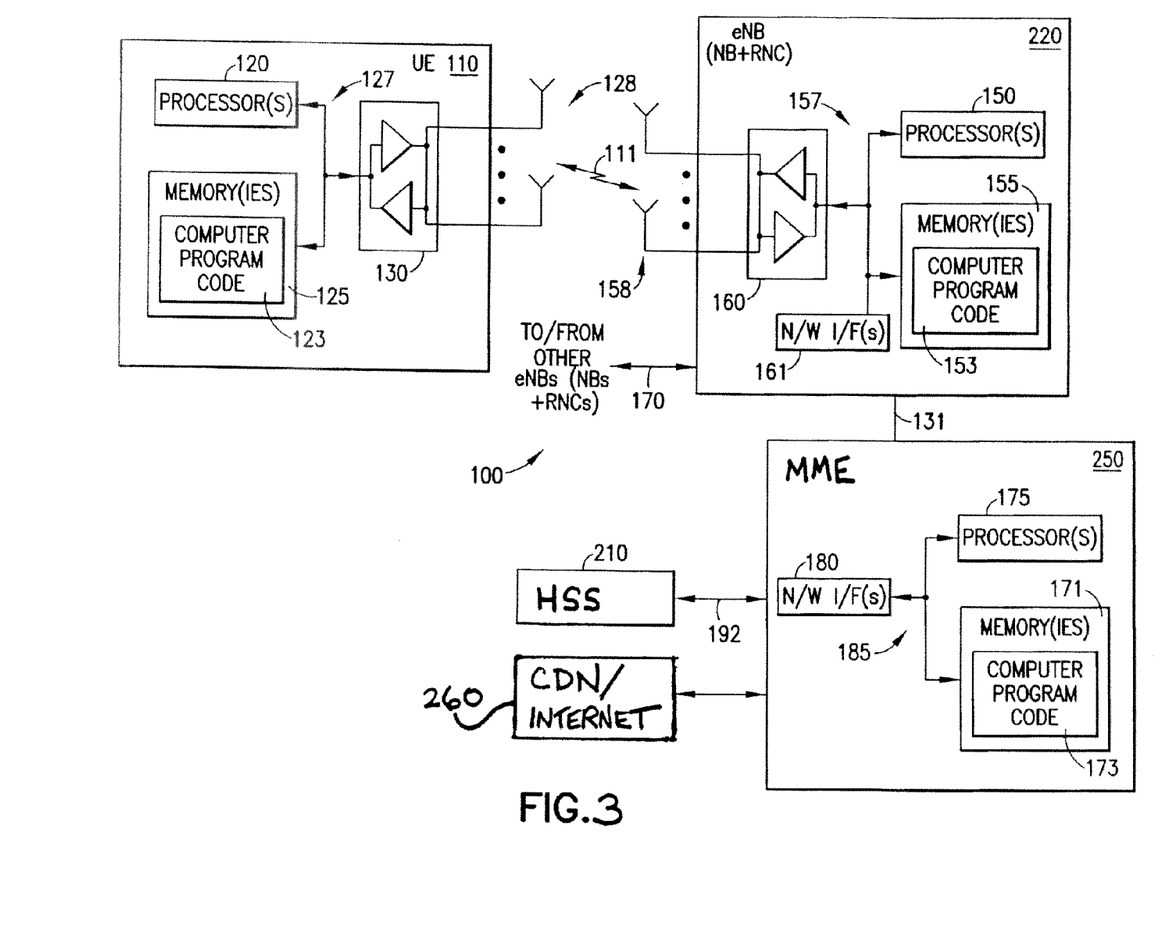
FIG. 3 is a hardware block diagram showing an illustrative operational environment for use with the instant invention.

It may be helpful to describe an illustrative system in which the exemplary embodiments of the invention may be practiced. FIG. 3 shows an illustrative system configured, for example, in accordance with a wireless communication standard referred to as long term evolution (LTE) and comprising an evolved packet core (EPC) 100. The EPC 100 includes one or more user equipments (UEs) 110, one or more base stations such as an evolved Node B (eNB) 220, a mobility management entity (MME) 250, and a home subscriber server (HSS) 210. The MME 250 is configured for communicating with a content delivery network 260 such as, for example, the Internet. The UE 110 is configured for wireless communication with the eNB 220 over a wireless link 111. The eNB 220 is configured to access one or more networks which, for illustrative purposes, may be a network 170 for accessing one or more additional eNBs and a network 130 for accessing the Internet.

The UE 110 includes one or more processors 120, one or more memories 125, and one or more transceivers 130 interconnected through one or more buses 127. The one or more transceivers 130 are connected to one or more antennas 128. The one or more memories 125 include computer program code 123. The one or more memories 125 may include a cache memory for storing one or more objects. Additionally or alternatively, the cache memory may be provided by one or more of the processor(s) 120. The one or more memories 125 and the computer program code 123 are configured, with the one or more processors 120, to cause the UE 110 to perform one or more of the operations as described herein.

The eNB 220 includes one or more processors 150, one or more memories 155, one or more network interfaces (N/W I/F(s)) 161, and one or more transceivers 160 interconnected through one or more buses 157. The one or more transceivers 160 are connected to one or more antennas 158. The one or more memories 155 may include a cache memory for storing one or more objects. Alternatively, or additionally, the cache memory may be provided by the one or more processors 150. The one or more memories 155 include computer program code 153. The one or more memories 155 and the computer program code 153 are configured, with the one or more processors 150, to cause the eNB 220 to perform one or more of the operations as described herein. The one or more network interfaces 161 communicate over a network such as the networks 170 and 131. Two or more eNBs 220 may communicate using. e.g., the network 170. The network 170 may be wired or wireless or both.

The MME 250 includes one or more processors 175, one or more memories 171, one or more network interfaces (N/W I/F(s)) 180 interconnected through one or more buses 185. The one or more memories 171 may include a cache memory for storing one or more objects. Alternatively or additionally, the cache memory may be provided by the one or more processors 175. The one or more memories 171 include computer program code 173. The one or more memories 171 and the computer program code 173 are configured, with the one or more processors 175, to cause the MME 250 to perform one or more of the operations as described herein.

Embodiments of the present invention may be implemented in software executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 9. A computer-readable medium may comprise a computer-readable storage medium (e.g., memories 125, 155, 171 or other device) that may be any media or means that can contain or store the instructions for use by or in connection with an instruction execution system, apparatus, or device, such as a computer.

The system of FIG. 3 illustratively performs the procedures shown in FIGS. 1A, 1B, or 2 by implementing messaging between one or more elements in the EPC 100 and the CDN 260. The messaging indicates which content, objects, flows, or users are associated with at least one of: (a) a specified cellular congestion level, (b) a specified cell. The messaging also encompasses further updates of loading in terms of predicted loading is anticipated for a particular cell. This messaging can be conveyed through a variety of mechanisms including, adding this information onto existing application packets, illustratively using uniform resource identifier (URI) "piggybacking" associated with that flow/user, where the annotated information is then passed through the CDN 260. Alternatively an explicit application programming interface (API) may convey this information from the EPC 100 up to the CDN 260. Conceivably, this messaging flow could be standardized in the future, e.g. within the 3GPP framework. Alternatively or additionally, the messaging may originate from the client, indicating, for example, signal strength such that the CDN 260 can use this information as indicated in FIGS. 1A, 1B, and 2. Within a cell with a given loading level, content which is particularly popular at the cell edge, e.g. with worse signal strength or fewer "bars," is given relatively higher priority for caching.

Generally the UE 110 is not aware of the eNB 220 utilization or cell loading, enabling a UE 110 embodiment where the decision for the UE 110 to cache an object is a function of the cell loading. However, there are number of alternative embodiments where the UE 110 is aware of the loading within a cell, e.g. over future LTE air interface signaling, or overt different application level embodiments. Alternatively or additionally, there are various scenarios in which the CDN 260 may influence a decision at the UE 110 as to which content will be locally cached at the UE 110. One specific example would be an explicit indication from an application server for a media optimizer over and application protocol that a particular object should be cached at the UE 110. A literal command from the CDN 260 may be used to indicate "preferentially cache items being retrieved now or in this area". Wireless link properties in addition to, or in lieu of, signal strength may be used to adjust caching priorities. For example, these properties may involve determining a cell type, such as a small cell or heterogeneous network (HetNET) versus macrocell, and adjusting caching priorities accordingly.

Consider an illustrative example wherein a first object is most likely than a second object to be downloaded within an overloaded cell. A second object is more popular than the first object across the cellular system, but tends to be retrieved only in relatively lightly loaded cells. In this example, the first object is more important to cache than the second item, in that it is relatively important to provide latency reduction for the overloaded wireless cell where over-the-air delay is longest. Within cellular systems, the CDN 260/UE 110 caching mechanism can be instrumental in enhancing the overall wireless system capacity. This is as opposed to the more traditional use of the CDN 260 where the CDN reduces the amount of traffic which is retrieved from the general Internet down to a communication service provider (CSP), and to reduce the latency on the largest number of objects retrieved.

The loading on cellular and wireless systems has a non-uniform spatial density distribution. In other words, a relatively small percentage of cells may be loaded whereas a large percentage of cells are underloaded. One feature of the operational sequences described with reference to FIGS. 1A, 1B, and 2 is that these methods differentiate the popularity of objects being retrieved in underloaded cells from the popularity of objects being retrieved in loaded cells. Additionally, an RF cost may be defined in terms of the number of physical resource blocks per kilobyte that is transferred, for example, using the system of FIG. 3.

The RF cost associated with retrieving an object to a UE 110 directly under a cellular or wireless tower is dramatically smaller than the RF cost of doing so when the UE 110 is at or near the edge of the cell. Pursuant to any of the methods described in FIGS. 1A, 1B, and 2, when caching avoids the retrieval of an object to the cell edge, this saves a disproportionately large number of physical resource blocks or eNB 220 resources, in contrast to situations where caching avoids the retrieval of an object to a UE 110 which is very close to the cellular or wireless tower. Thus, it is significantly more important in terms of cell capacity and user experience for a cached object in the CDN 260 to reduce latency for a UE 110 at the cell edge, as opposed to reducing the latency of retrieving an object to a UE 110 which is near the tower. This is because the additional RF resources required to reduce/limit delay for a cell edge user are dramatically greater for the cell edge user than for the near-the-tower user.

The methods described in FIGS. 1A, 1B, and 2 are able to advantageously exploit the possibility of non-uniform geographic popularity of objects. In other words, it is typical for some objects to be consistently popular in one geographic area where other objects are consistently popular in other geographic areas. Anecdotal examples include a peer group gathering at a specified location, where the peer group automatically tends to be interested in the same group of objects, such as items which are located on one another's Facebook™ pages. Other examples include objects which are associated with a concert or a sporting event, or are likely to be more popular for users geographically close to the concert or sporting event. Yet another example is passengers riding on a train where objects which require the user to watch the screen are popular, whereas streaming audio may be more popular among users who are driving along an interstate highway. Still another example considers a particular user who lives or works at a specific location in an overloaded cell, and/or near a cell edge. Such a user is more likely to request the same objects which they have requested in the past. Furthermore, such a user is likely to request these objects from that specific location. This scenario presents yet another example wherein an object that is popular at one location is relatively likely to continue to be popular at that specific location.

If desired, the different functions discussed herein may be performed in a different order and/or concurrently with each other. Furthermore, if desired, one or more of the above-described functions may be optional or may be combined. Although various aspects of the invention are set out above, other aspects of the invention comprise other combinations of features from the described embodiments, and not solely the combinations explicitly set out above.

It is also noted herein that while the above describes example embodiments of the invention, these descriptions should not be viewed in a limiting sense. Rather, there are several variations and modifications which may be made without departing from the scope of the present invention.

What is claimed is:

1. A method comprising:
    determining that a first object associated with a first wireless link has a first caching priority;
    determining that a second object associated with a second wireless link has a second caching priority;
    increasing the first caching priority relative to the second caching priority in response to one or more of:
        the first wireless link having a larger congestion than the second wireless link, the first wireless link having a weaker signal strength than the second wireless link, or the first object being associated with a higher status or priority than the second object;
    determining a first cell identifier associated with the first wireless link based upon a previous download of the first object over the first wireless link; and
    determining a second cell identifier associated with a second wireless link based upon a previous download of the second object over the second wireless link.

2. The method of claim 1 further comprising adjusting a first wireless loading attribute for a first cell associated with the first wireless link based upon current loading conditions at the first cell.

3. The method of claim 2 further comprising adjusting a second wireless loading attribute for a second cell associated with the second wireless link based upon current loading conditions at the second cell.

4. The method of claim 1 further comprising:
    determining at least a first location identifier or a first user identifier associated with the first object based upon a previous download of the first object over the first wireless link; and
    determining at least a second location identifier or a second user identifier associated with the second object based upon a previous download of the second object over the second wireless link.

5. The method of claim 4 further comprising adjusting a first customer equipment management priority attribute based upon at least one of the first location identifier or the first user identifier.

6. The method of claim 5 further comprising adjusting a second customer equipment management priority attribute based upon at least one of the second location identifier or the second user identifier.

7. An apparatus comprising at least one processor and at least one memory including computer program code, the at least one memory and the computer program code being configured, with the at least one processor, to cause the apparatus to perform at least:
    determining that a first object associated with a first wireless link has a first caching priority;
    determining that a second object associated with a second wireless link has a second caching priority;
    increasing the first caching priority relative to the second caching priority in response to one or more of:
        the first wireless link having a larger congestion than the second wireless link,
        the first wireless link having a weaker signal strength than the second wireless link, or
        the first object being associated with a higher status or priority than the second object;
    determining a first cell identifier associated with the first wireless link based upon a previous download of the first object over the first wireless link; and
    determining a second cell identifier associated with a second wireless link based upon a previous download of the second object over the second wireless link.

8. The apparatus of claim 7 wherein the computer program code is configured, with the at least one processor, to cause the apparatus to further perform adjusting a first wireless loading attribute for a first cell associated with the first wireless link based upon current loading conditions at the first cell.

9. The apparatus of claim 8 wherein the computer program code is configured, with the at least one processor, to cause the apparatus to further perform adjusting a second wireless loading attribute for a second cell associated with the second wireless link based upon current loading conditions at the second cell.

10. The apparatus of claim 7 wherein the computer program code is configured, with the at least one processor, to cause the apparatus to further perform:
    determining at least a first location identifier or a first user identifier associated with the first object based upon a previous download of the first object over the first wireless link; and
    determining at least a second location identifier or a second user identifier associated with the second object based upon a previous download of the second object over the second wireless link.

11. The apparatus of claim 10 wherein the computer program code is configured, with the at least one processor, to cause the apparatus to further perform adjusting a first customer equipment management priority attribute based upon at least one of the first location identifier or the first user identifier.

12. The apparatus of claim 11 wherein the computer program code is configured, with the at least one processor, to cause the apparatus to further perform adjusting a second customer equipment management priority attribute based upon at least one of the second location identifier or the second user identifier.

13. A computer program product including at least one non-transitory computer-readable storage medium having computer-executable program code instructions stored therein, the computer-executable program code instructions including program code instructions for:
    determining that a first object associated with a first wireless link has a first caching priority;
    determining that a second object associated with a second wireless link has a second caching priority;
    increasing the first caching priority relative to the second caching priority in response to one or more of: the first wireless link having a larger congestion than the second wireless link, the first wireless link having a weaker signal strength than the second wireless link, or the first object being associated with a higher status or priority than the second object;

determining a first cell identifier associated with the first wireless link based upon a previous download of the first object over the first wireless link; and determining a second cell identifier associated with a second wireless link based upon a previous download of the second object over the second wireless link.

14. The computer program product of claim 13 further comprising instructions for adjusting a first wireless loading attribute for a first cell associated with the first wireless link based upon current loading conditions at the first cell.

15. The computer program product of claim 14 further comprising instructions for adjusting a second wireless loading attribute for a second cell associated with the second wireless link based upon current loading conditions at the second cell.

16. The computer program product of claim 13 further comprising instructions for:

determining at least a first location identifier or a first user identifier associated with the first object based upon a previous download of the first object over the first wireless link; and determining at least a second location identifier or a second user identifier associated with the second object based upon a previous download of the second object over the second wireless link.

17. The computer program product of claim 16 further comprising instructions for adjusting a first customer equipment management priority attribute based upon at least one of the first location identifier or the first user identifier.

18. The computer program product of claim 17 further comprising instructions for adjusting a second customer equipment management priority attribute based upon at least one of the second location identifier or the second user identifier.

* * * * *